United States Patent
Sugihara et al.

(10) Patent No.: US 10,126,555 B2
(45) Date of Patent: Nov. 13, 2018

(54) EYEPIECE OPTICAL MEMBER AND HEAD-MOUNTED DISPLAY DEVICE

(71) Applicant: OLYMPUS CORPORATION, Tokyo (JP)

(72) Inventors: Ryohei Sugihara, Tokyo (JP); Yoichi Iba, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 175 days.

(21) Appl. No.: 15/220,668

(22) Filed: Jul. 27, 2016

(65) Prior Publication Data
US 2016/0334626 A1    Nov. 17, 2016

Related U.S. Application Data

(63) Continuation of application No. PCT/JP2014/000448, filed on Jan. 29, 2014.

(51) Int. Cl.
*G02B 27/01* (2006.01)
*G02B 5/04* (2006.01)
*G02B 6/00* (2006.01)

(52) U.S. Cl.
CPC ....... *G02B 27/0172* (2013.01); *G02B 27/017* (2013.01); *G02B 27/0176* (2013.01);
(Continued)

(58) Field of Classification Search
CPC .. G02B 27/01; G02B 27/0101; G02B 27/017; G02B 27/0172; G02B 27/0176;
(Continued)

(56) References Cited

U.S. PATENT DOCUMENTS

| | | | | |
|---|---|---|---|---|
| 6,680,802 B1* | 1/2004 | Ichikawa | .......... | G02B 27/0172 |
| | | | | 359/630 |
| 2013/0070338 A1* | 3/2013 | Gupta | ............... | G02B 27/0172 |
| | | | | 359/485.05 |
| 2013/0182334 A1* | 7/2013 | Sugihara | ........... | G02B 27/0172 |
| | | | | 359/630 |

FOREIGN PATENT DOCUMENTS

| | | |
|---|---|---|
| JP | 2012-063633 A | 3/2012 |
| JP | 2012-063638 A | 3/2012 |

(Continued)

OTHER PUBLICATIONS

English translation of JP 2012-63633, machine translated on Dec. 12, 2017.*

(Continued)

*Primary Examiner* — Jie Lei
(74) *Attorney, Agent, or Firm* — Scully, Scott, Murphy & Presser, P.C.

(57) ABSTRACT

An eyepiece optical member has an easy-to-clean interior, and a head-mounted display device is provided with the eyepiece optical member. The eyepiece optical member includes a housing with a built-in display element, a light guide prism in which image light from the display element enters through an entrance surface and is guided to exit from an exit surface towards an eyeball of an observer so as to be observed as a magnified virtual image, and a protective member formed separately from the housing and covering a portion of the light guide prism. The housing includes two opposing plate-like portions, the light guide prism is fixed to the protective member as an assembled member, and the assembled member is sandwiched between the two opposing plate-like portions. The head-mounted display device includes a support member for fixation to a wearer's head and includes the eyepiece optical member attached to the support member.

11 Claims, 8 Drawing Sheets

(52) U.S. Cl.
CPC ............... *G02B 5/04* (2013.01); *G02B 6/00* (2013.01); *G02B 2027/0178* (2013.01); *G02B 2027/0181* (2013.01)

(58) Field of Classification Search
CPC .... G02B 27/013; G02B 27/0149; G02B 6/00; G02B 5/04; G02B 2027/0178; G02B 2027/0181
USPC ........... 359/13, 630–633; 345/7, 8; 348/115, 348/116; 349/11
See application file for complete search history.

(56) References Cited

FOREIGN PATENT DOCUMENTS

| | | |
|---|---|---|
| JP | 2012-203113 A | 10/2012 |
| WO | WO 2012/035677 A1 | 3/2012 |

OTHER PUBLICATIONS

International Search Report dated Mar. 4, 2014 issued in PCT/JP2014/000448.

* cited by examiner

EYEPIECE OPTICAL MEMBER AND HEAD-MOUNTED DISPLAY DEVICE

CROSS-REFERENCE TO RELATED APPLICATION

The present application is a Continuing Application based on International Application PCT/JP2014/000448 filed on Jan. 29, 2014, the entire disclosure of this earlier application being incorporated herein by reference.

TECHNICAL FIELD

This disclosure relates to an eyepiece optical member and a head-mounted display device.

BACKGROUND

A variety of eyepiece optical members that can guide image light from a compact display panel with a light guide prism to allow observation of the image light as a magnified virtual image have been proposed (for example, see JP 2012-203113 A (PTL 1)). Such an eyepiece optical member can be used as a wearable device, such as a head-mounted display (HMD), by being mounted in a display device that can be worn on the observer's head.

In such an eyepiece optical member, a portion of the light guide prism is sometimes exposed from the housing to reduce size. When exposing a portion of the light guide prism, the front of the light guide prism that is exposed could be covered by a protective cover secured to the light guide prism.

CITATION LIST

Patent Literature

PTL 1: JP 2012-203113 A

SUMMARY

The aforementioned method, however, has the problem that rainwater, sweat, or the like may enter through a gap between the light guide prism and the protective cover and soil the light guide prism and the like. If the light guide prism is not cleaned, unnecessary scattering and the like may occur and cause flares or the like in the display image, or the material properties of the light guide prism might change.

It is thus necessary to clean the surface soiled by rainwater, sweat, or the like that enters between the light guide prism and the protective cover, but the protective cover is secured to the light guide prism and needs to be detached with a tool, making cleaning difficult.

It would therefore be helpful to provide an eyepiece optical member, and a head-mounted display device provided with the eyepiece optical member, that has an easy-to-clean interior.

An eyepiece optical member according to this disclosure includes: a housing with a built-in display element; a light guide prism in which image light from the display element enters through an entrance surface and is guided to exit from an exit surface towards an eyeball of an observer so as to be observed as a magnified virtual image; and a protective member formed separately from the housing and covering a portion of the light guide prism; wherein the housing includes two opposing plate-like portions; and the light guide prism is fixed to the protective member as an assembled member, and the assembled member is sandwiched between the two opposing plate-like portions.

In the eyepiece optical member, a concavity and a convexity may form a pair, the protective member including one of the concavity and the convexity, and the light guide prism including the other of the concavity and the convexity; and by the protective member and the light guide prism being sandwiched between the two opposing plate-like portions, the concavity and the convexity may engage to configure the protective member and the light guide prism as the assembled member.

In the eyepiece optical member, the light guide prism and the protective member may be attachable to and detachable from the housing as the assembled member.

In the eyepiece optical member, the protective member may be shaped to cover a front of the eyepiece optical member when the observer of the light guide prism wears the eyepiece optical member on a head.

As used herein, the "front" refers to the surface that, among the surfaces facing the observer when the observer wears the eyepiece optical member on the head, is farther from the observer (i.e. on the opposite side of the eyepiece optical member from the observer).

In the eyepiece optical member, the light guide prism may include a reflecting surface on at least a portion of a side of the light guide prism; and
the protective member may cover at least the reflecting surface.

In the eyepiece optical member, the light guide prism may include a projection for fixing the protective member, and the projection may be formed on a prism tip that is a portion of the light guide prism between the exit surface and the reflecting surface.

In the eyepiece optical member, an end of the protective member at the exit surface side may be shaped to project further toward the observer than the exit surface.

In the eyepiece optical member, the housing may include an opening at one end of the housing along a direction of an optical axis of the display element, and a portion of the light guide prism at the entrance surface side may be inserted into the opening; the opening and one of the plate-like portions may form a fitting portion into which the assembled member fits; the assembled member may be slidable in a longitudinal direction of the light guide prism; and a convexity and a receiving groove may form a pair and regulate a slide width of the assembled member, one of the convexity and the receiving groove being formed on the housing side of the fitting portion and the other of the convexity and the receiving groove being formed on the protective member side or the light guide prism side of the fitting portion.

In the eyepiece optical member, by the fitting portion being releasable by the observer, the light guide prism may be detachable from the housing while fixed to the protective member as the assembled member.

In the eyepiece optical member, a slide guide or a slide guide receiving portion allowing the assembled member to slide in a longitudinal direction of the light guide prism may be formed on one of the two opposing plate-like portions; and a convexity or a receiving groove that regulates a slide width may be formed on the other of the two opposing plate-like portions.

In the eyepiece optical member, a portion or all of two sides of the protective member and the light guide prism in a front-back direction of the observer may be polished surfaces; and the protective member may be made of a material that transmits light.

A head-mounted display device according to this disclosure includes a support member for fixation to a head of a wearer; and the aforementioned eyepiece optical member, attached to the support member.

DETAILED DESCRIPTION

The following describes embodiments in detail with reference to the drawings.

Embodiment 1

Figure 1A:
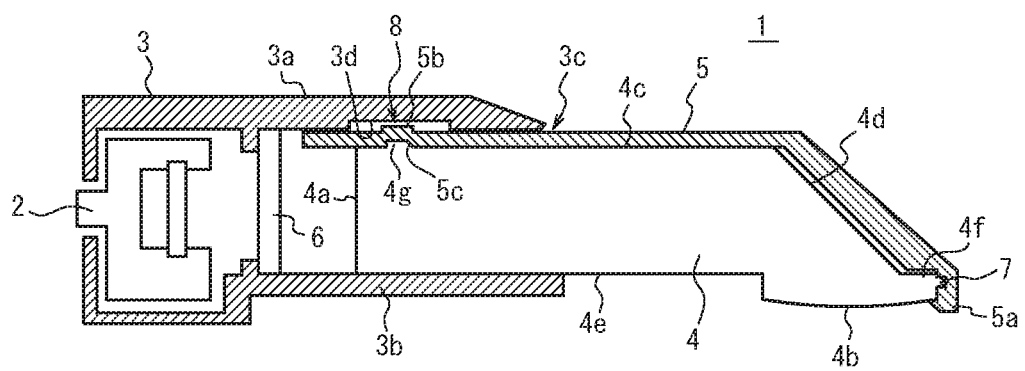
FIG. 1A is a cross-sectional view and FIGS. 1B and 1C are perspective views illustrating an eyepiece optical member according to Embodiment 1.
Figure 1B:
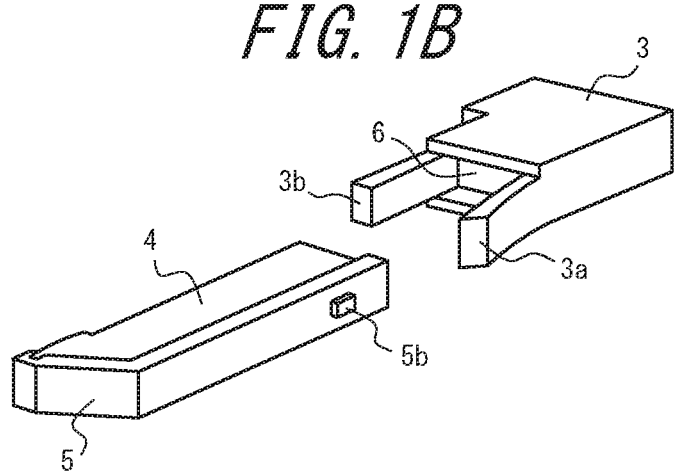
Figure 1C:
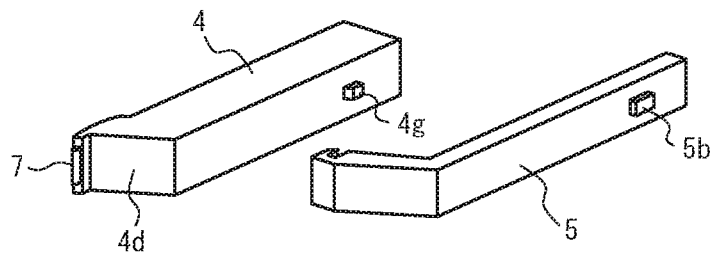

FIG. 1A is a cross-sectional view and FIGS. 1B and 1C are perspective views illustrating an eyepiece optical member according to Embodiment 1.

As illustrated in FIG. 1A, the eyepiece optical member 1 of this embodiment includes a housing 3 with a built-in display element 2, a light guide prism 4 in which image light from the display element 2 enters through an entrance surface 4a and is guided to exit from an exit surface 4b towards the observer's eyeball so as to be observed as a magnified virtual image, and a protective member 5 that is formed separately from the housing 3 and covers a portion of the light guide prism 4. A cover glass 6 that transmits light is disposed between the display element 2 and the entrance surface 4a.

In the example illustrated in FIG. 1A, the housing 3 includes two opposing plate-like portions 3a and 3b. The light guide prism 4 is fixed to the protective member 5 as an assembled member, and the assembled member is sandwiched between these plate-like portions 3a and 3b to be attached to the housing 3. As described below, the light guide prism 4 and the protective member 5 are attachable to and detachable from the housing 3 as the assembled member.

As illustrated in FIG. 1A, at one end of the housing 3 along the optical axis direction of the display element 2 (in the illustrated example, the longitudinal direction of the housing 3), the housing 3 has an opening 3c into which a portion of the light guide prism 4 at the entrance surface 4a side is inserted. As illustrated in FIG. 1A, a portion of the light guide prism 4 is inserted into the opening 3c, and the remainder of the light guide prism 4 is exposed.

The protective member 5 has a shape covering only the sides 4c and 4d of the light guide prism 4. In the illustrated example, among the top and bottom surfaces and the sides, the side 4a that is the entrance surface and the side 4e that faces the observer are not covered by the protective member 5. In the example illustrated in FIG. 1A, the protective member 5 covers only the sides 4c and 4d, but the protective member 5 may instead be configured to cover only the reflecting surface 4d. The protective member 5 preferably covers at least the reflecting surface 4d.

The side 4c is the front when the observer wears the eyepiece optical member on the head, and the side 4d is the front when the eyepiece optical member is worn with the optical axis direction of the display element 2 illustrated in FIG. 1A (the longitudinal direction of the housing 3) in the vertical direction of the observer.

The material of the plate-like portions 3a and 3b is preferably an elastic material. Non-limiting examples include polyethylene terephthalate, polycarbonate, and acrylic.

Furthermore, as illustrated in FIG. 1A, in this eyepiece optical member 1, a projection 7 for fixing the light guide prism 4 to the protective member 5 is formed on the light guide prism 4 at a prism tip 4f, which is a portion between the exit surface 4b and the reflecting surface 4d. An end 5a of the protective member 5 at the exit surface 4b side engages with this projection 7, and the end 5a is shaped to project further toward the observer than the exit surface 4b (when the observer wears a head-mounted display device that includes the eyepiece optical member 1 illustrated in FIG. 1A and a support member).

Here, as illustrated in FIG. 1A, a receiving groove 3d is formed on the plate-like portion 3a of the housing 3. A convexity 5b fits into this receiving groove 3d and prevents the assembled member from dropping out of the housing 3 while also allowing a fitting portion 8 (and hence the assembled member) to slide within the receiving groove 3d. In other words, the housing 3 and the fitting portion 8 of the assembled member constituted by the light guide prism 4 and the protective member 5 can slide in the longitudinal direction of the light guide prism 4.

In the illustrated example, the width over which the assembled member slides (slide width) is regulated by the size of the receiving groove 3d and the convexity 5b. In the illustrated example, the receiving groove 3d is provided in the housing 3, and a convexity that fits into the receiving groove 3d is provided in the protective member 5, but this disclosure is not limited to this case. A convexity and a receiving groove that form a pair and that regulate the slide width of the assembled member may be formed on the housing 3 side and on the protective member 5 side or the light guide prism 4 side of the fitting portion 8. Alternatively, a receiving groove may be provided on the protective member 5 and a convexity that fits therein may be provided on the housing 3.

Furthermore, as illustrated in FIG. 1A, a convexity 4g is formed on the light guide prism 4, whereas a concavity 5c that forms a pair with this convexity 4g is formed on the protective member 5. As illustrated in FIG. 1A, the protective member 5 and the light guide prism 4 are sandwiched between the two opposing plate-like portions 3a and 3b. As a result, the convexity 4g and the concavity 5c engage, thereby configuring the light guide prism 4 and the protective member 5 as an assembled member. In the example illustrated in FIGS. 1A, 1B, and 1C, the convexity 4g and the concavity 5c that are an engaging portion with both the protective member 5 and the light guide prism 4 are provided, but instead processing may be applied to only the protective member 5 for engagement with the light guide prism 4. Furthermore, a concavity may be provided on the light guide prism 4 and a convexity provided on the protective member 5. As a result of the convexity 4g and the concavity 5c, the light guide prism 4 and the protective member 5 can be attached and detached easily.

The following describes the effects of this embodiment. According to this embodiment, first, as illustrated in FIG. 1A, the protective member 5 covers the sides 4c and 4d of the light guide prism 4 and therefore protects the sides 4c and 4d, preventing them from being damaged, soiled, or the like. Furthermore, the light guide prism 4 is structured to be attachable to and detachable from the housing 3 while fixed to the protective member 5 as the assembled member. Therefore, as illustrated in FIG. 1B, the observer can release the fitting portion 8 by releasing the engagement between the convexity 5b and the receiving groove 3d by pulling back the plate-like portion 3a by hand (in FIG. 1B, the plate-like portion 3a is shown as being pulled back; the same is true in FIGS. 3B and 5B corresponding to the below-described embodiments). Therefore, the light guide prism 4 can easily be detached from the housing 3 while fixed to the protective member 5 as the assembled member. The protective member 5 is structured to be sandwiched between the light guide prism 4 and the plate-like portion 3a. Hence, by simply pulling back the plate-like portion 3a as described above, the assembled member can be detached without using a tool or the like. Furthermore, as illustrated in FIG. 1C, by releasing the engagement between the convexity 4g and the concavity 5c, the protective member 5 can also easily be detached from the light guide prism 4.

Accordingly, the observer can easily clean the inside of the eyepiece optical member 1, such as the cover glass 6, the light guide prism 4, the protective member 5, the inside of the housing 3, and the like. In particular, as illustrated in FIGS. 1A, 1B, and 1C, the protective member 5 only covers the sides. Hence, the vertical thickness is small and the depth to the cover glass 6 is shallow, thereby allowing the cover glass 6 to be cleaned easily with a cotton swab or the like and facilitating a reduction in size.

Furthermore, at the time of reuse, the protective member 5 can easily be attached to the light guide prism 4 by engaging the convexity 4g with the concavity 5c, and this assembled member can easily be attached to the housing 3 by simply engaging the convexity 5b and the receiving groove 3d.

Furthermore, in this embodiment, the protective member 5 is shaped to cover only the sides 4c and 4d of the light guide prism 4, and therefore for example when worn with the optical axis direction of the display element 2 illustrated in FIG. 1A (the longitudinal direction of the housing 3) in the horizontal direction of the observer, the thickness in the vertical direction as seen from the observer does not increase, thereby sufficiently guaranteeing the field of view. By adopting a structure that at least covers the optically important reflecting surface 4d, the device can be made even smaller and lighter.

According to this embodiment, by providing the projection 7 at the prism tip 4f, the protective member 5 can easily be attached to the light guide prism 4 by engagement with this projection. Furthermore, the end 5a of the protective member 5 at the exit surface 4b side is shaped to project further toward the observer than the exit surface 4b, thereby protecting the exit surface 4b.

Additionally, in this embodiment, the convexity 5b fits into the receiving groove 3d and can slide within the receiving groove 3d, thereby allowing diopter adjustment by adjusting the slide width. Also, with the convexity 4g and the concavity 5c, an engaging portion for the light guide prism 4 and the protective member 5 is formed. Hence, the protective member 5 can easily be attached to and detached from the light guide prism 4. Accordingly, any rain, sweat, dust, or the like entering between the protective member 5 and the light guide prism 4 can easily be cleaned.

Embodiment 2

Figure 2A:
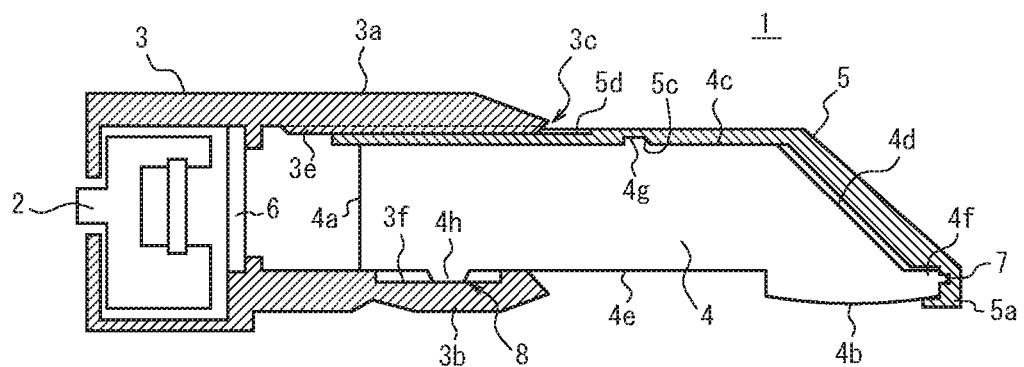
FIG. 2A is a cross-sectional view and FIGS. 2B and 2C are perspective views illustrating an eyepiece optical member according to Embodiment 2.
Figure 2B:
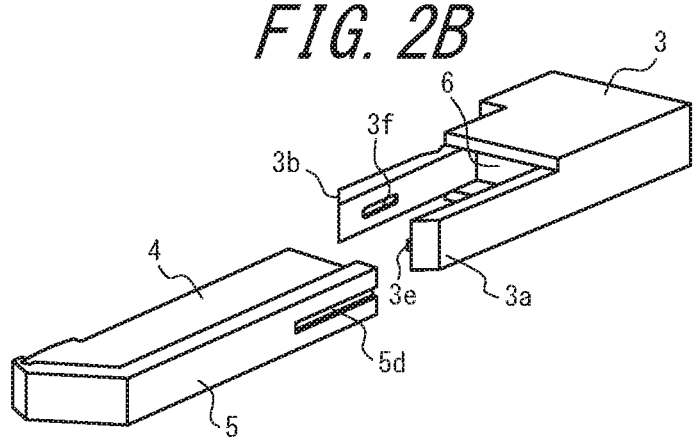
Figure 2C:
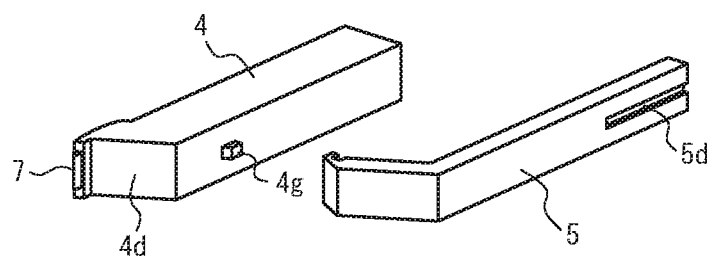

FIG. 2A is a cross-sectional view and FIGS. 2B and 2C are perspective views illustrating an eyepiece optical member according to Embodiment 2.

Embodiment 2 differs from Embodiment 1 in that a dropout prevention mechanism to prevent the assembled member from dropping out of the housing 3 and a slide mechanism are provided separately.

In other words, as illustrated in FIG. 2A, in this eyepiece optical member 1, a slide guide 3e that allows the assembled member to slide in the longitudinal direction of the light guide prism 4 is formed in the plate-like portion 3a, and the fitting portion 8 for the assembled member to fit into the housing 3 is formed in the other plate-like portion 3b.

First, with regard to the slide mechanism, as illustrated in FIG. 2A, a slide guide receiving portion 5d that engages with the slide guide 3e is provided in the protective member 5, and the slide guide 3e can slide within the slide guide receiving portion 5d.

Next, as the dropout prevention mechanism, a concavity 3f is provided in the plate-like portion 3b, and a convexity 4h is provided in the light guide prism 4. The fitting portion 8 is formed by the concavity 3f and the convexity 4h fitting together. As a result, the assembled member is prevented from dropping out of the housing 3.

Furthermore, the concavity 3f provided in the plate-like portion 3b also functions as a receiving groove that regulates the slide width of the slide mechanism. In the example illustrated in FIG. 2A, the concavity 3f is provided in the plate-like portion 3b and the convexity 4h is provided in the light guide prism 4 to form the fitting portion 8, but alternatively, a convexity may be provided in the plate-like portion 3b and a concavity provided in the light guide prism 4 to form the fitting portion. In this case, the convexity regulates the slide width of the slide mechanism.

In this embodiment, by providing the dropout prevention mechanism and the slide mechanism separately, the slide width of the slide guide 3e can be increased, and the assembled member can be prevented from wobbling.

As illustrated in FIG. 2B, the light guide prism 4 is structured to be attachable to and detachable from the housing 3 while fixed to the protective member 5 as the assembled member, as in Embodiment 1. Therefore, as in Embodiment 1, the observer can easily release the fitting portion 8 and detach the assembled member from the housing 3. Furthermore, as illustrated in FIG. 2C, the observer can release the engagement between the convexity 4g and the concavity 5c and easily detach the protective member 5 from the light guide prism 4, allowing the inside of the eyepiece optical member 1 to be cleaned easily.

Embodiment 3

Figure 3A:
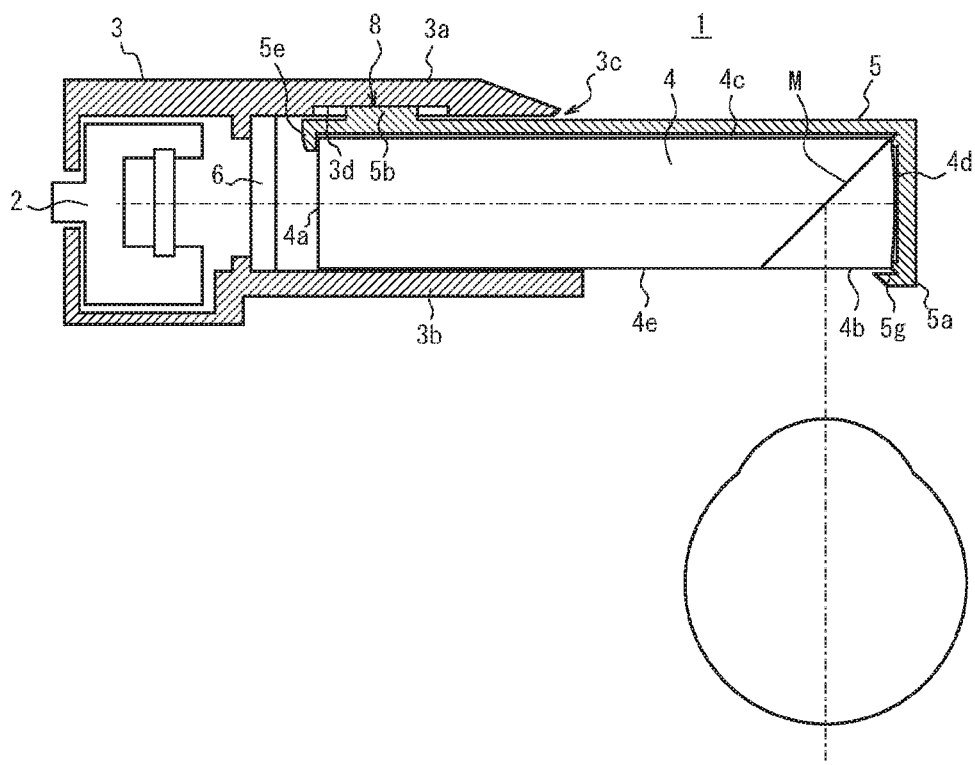
FIG. 3A is a cross-sectional view and FIGS. 3B and 3C are perspective views illustrating an eyepiece optical member according to Embodiment 3.
Figure 3B:
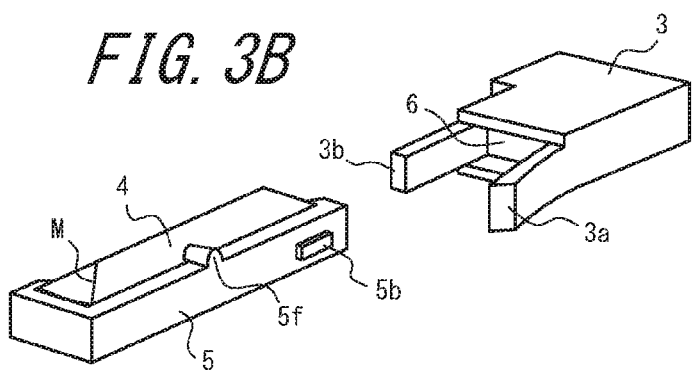
Figure 3C:
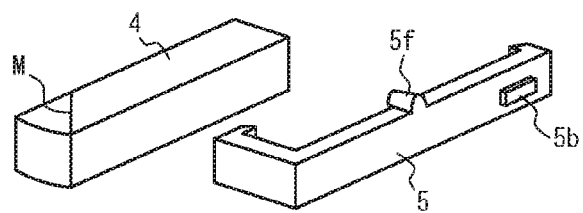

FIG. 3A is a cross-sectional view and FIGS. 3B and 3C are perspective views illustrating an eyepiece optical member according to Embodiment 3.

As illustrated in FIG. 3A, in this embodiment, the light guide prism 4 is rectangular in the cross-sectional view, and a semi-transparent mirror M is used to guide the image light. In other words, the image light entering from the entrance surface 4a passes through the semi-transparent mirror M to reach and be reflected by the reflecting surface 4d formed as a concave mirror. The reflected light is further reflected by the semi-transparent mirror M so as to be emitted from the exit surface 4b towards the observer's eyeball.

As illustrated in FIGS. 3A to 3C, convexities 5e, 5f, and 5g for attaching the protective member 5 to the light guide prism 4 are formed on the protective member 5.

According to the structure illustrated in FIG. 3A, since the basic structure is similar to that of Embodiment 1 illustrated in FIG. 1A, the user can easily detach the assembled member from the housing 3 (FIG. 3B) and furthermore can easily detach the protective member 5 from the light guide prism 4 (FIG. 3C), allowing the inside of the eyepiece optical member 1 to be cleaned easily.

Furthermore, according to Embodiment 3 illustrated in FIG. 3A, since the sides of the light guide prism 4 are not processed to form concavities, convexities, or the like, the steps for such processing can be omitted, and unwanted scattering of light can be further suppressed.

With the convexities 5e, 5f, and 5g, the protective member 5 is attached to the light guide prism 4 to form the assembled member. Hence, as a result of the fitting portion 8 formed by the convexity 5b and the receiving groove 3d, the protective member 5 and the light guide prism 4 can slide integrally.

In particular, with the convexity 5f extending along the upper surface of the light guide prism 4, the light guide prism 4 can be controlled from moving vertically as seen from the observer.

Furthermore, the sides 4b, 4c, and 4e in front of the observer extend straight in the longitudinal direction of the prism. Hence, by forming the protective member from a material that transmits light, a wide field of view can be guaranteed through the light guide prism 4 and the protective member 5.

Embodiment 4

Figure 4A:
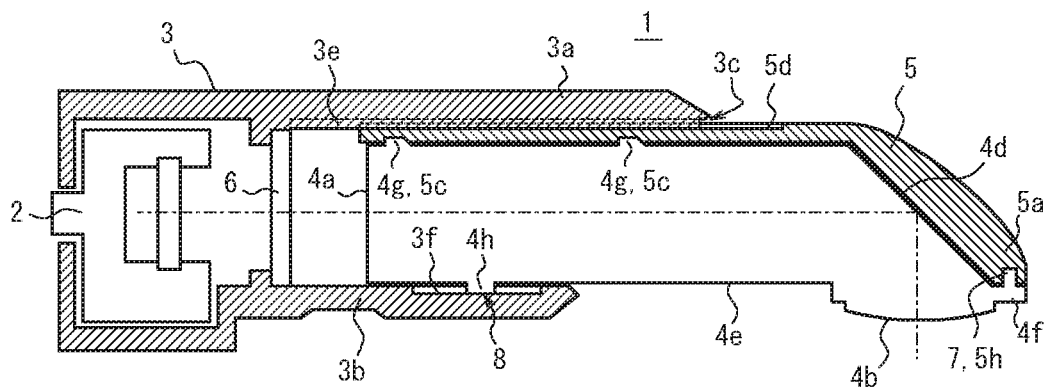
FIG. 4A is a cross-sectional view and FIGS. 4B and 4C are perspective views illustrating an eyepiece optical member according to Embodiment 4.
Figure 4B:
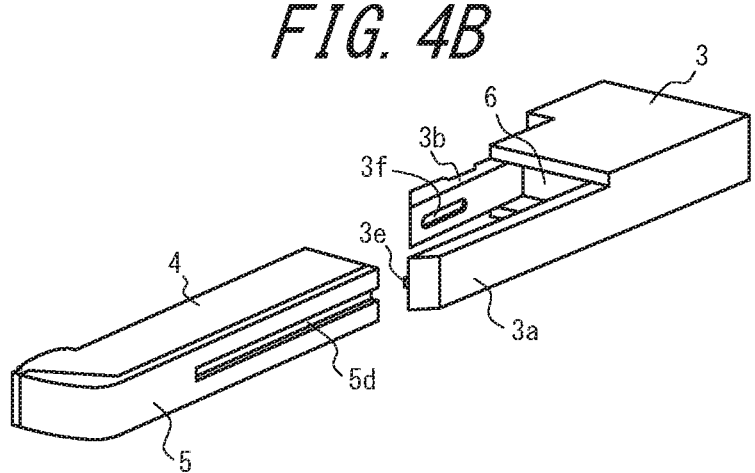
Figure 4C:
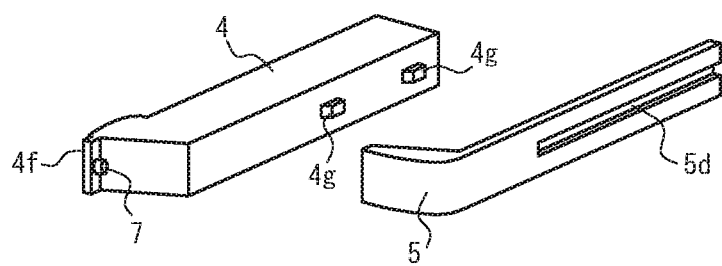

FIG. 4A is a cross-sectional view and FIGS. 4B and 4C are perspective views illustrating an eyepiece optical member according to Embodiment 4.

In the eyepiece optical member 1 of the embodiment illustrated in FIG. 4A, the projection 7 is formed on the prism tip 4f, and a concavity 5h is formed on the end 5a of the protective member 5. By the projection 7 and the concavity 5h engaging, the light guide prism 4 and the protective member 5 can easily be attached and detached.

In the embodiment illustrated in FIGS. 4A, 4B, and 4C, the plate-like portion 3a is formed to be longer than the other plate-like portion 3b, allowing a further increase in the slide width as compared to Embodiment 2.

Therefore, in the embodiment illustrated in FIGS. 4A, 4B, and 4C, two convexities 4g are also formed in the light guide prism 4 and engage with two concavities 5c formed in the protective member, thereby more firmly fixing the light guide prism 4 to the protective member 5.

The remaining structure of the eyepiece optical member 1 according to Embodiment 4 is similar to that of Embodiment 2 illustrated in FIGS. 2A, 2B, and 2C. Therefore, similar effects to those of Embodiment 2 as described above are achieved: as illustrated in FIGS. 4B and 4C, the assembled member can easily be detached from the housing 3, and the protective member 5 can easily be detached from the light guide prism 4, allowing the inside of the eyepiece optical member 1 to be cleaned easily.

Embodiment 5

Figure 5A:
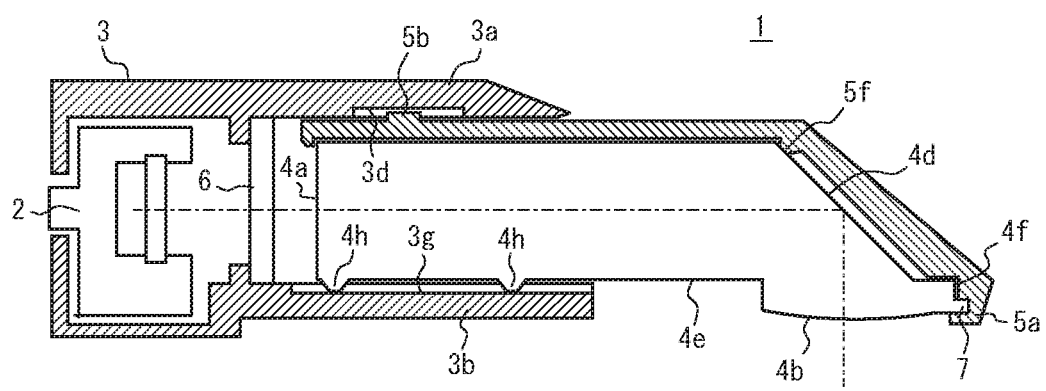
FIG. 5A is a cross-sectional view and FIGS. 5B and 5C are perspective views illustrating an eyepiece optical member according to Embodiment 5.
Figure 5B:
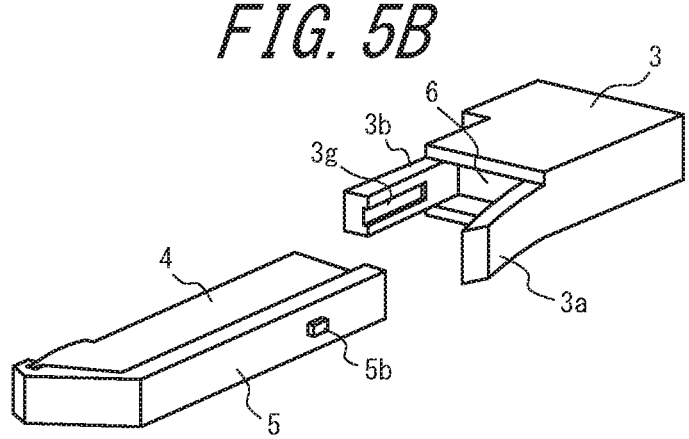
Figure 5C:
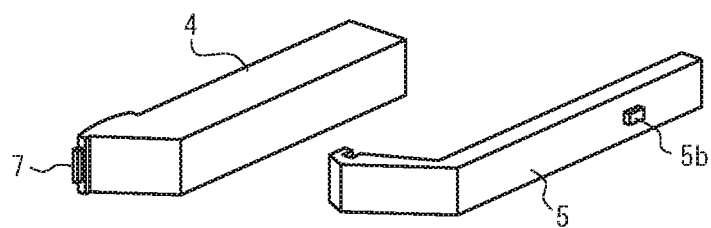

FIG. 5A is a cross-sectional view and FIGS. 5B and 5C are perspective views illustrating an eyepiece optical member according to Embodiment 5.

As illustrated in FIG. 5A, the eyepiece optical member 1 of this embodiment is similar to Embodiment 2 in that the dropout prevention mechanism to prevent the assembled member from dropping out from the housing 3 and the slide mechanism are provided separately but differs from Embodiment 2 in that the dropout prevention mechanism is provided at the plate-like portion 3a side, whereas the slide mechanism is provided at the plate-like portion 3b side.

This embodiment also differs from Embodiment 2 in that, at the dropout prevention mechanism side, the convexity 5b is provided on the protective member 5 rather than on the light guide prism 4 and fits with the receiving groove 3d of the plate-like portion 3a. Also, in the slide mechanism, two convexities 4h are provided on the light guide prism 4 rather than on the protective member 5. In other words, as illustrated in FIG. 5A, a receiving groove 3g is provided on the plate-like portion 3b and fits with the two convexities 4h. This fitting portion allows sliding in the longitudinal direction of the light guide prism 4.

According to this embodiment as well, similar effects to those of Embodiment 2 as described above are achieved: as illustrated in FIGS. 5B and 5C, the assembled member can easily be detached from the housing 3, and the protective member 5 can easily be detached from the light guide prism 4, allowing the inside of the eyepiece optical member 1 to be cleaned easily. Also, since the dropout prevention mechanism and the slide mechanism are provided separately, the slide width can be increased as in Embodiment 2.

Embodiment 6

Figure 6:
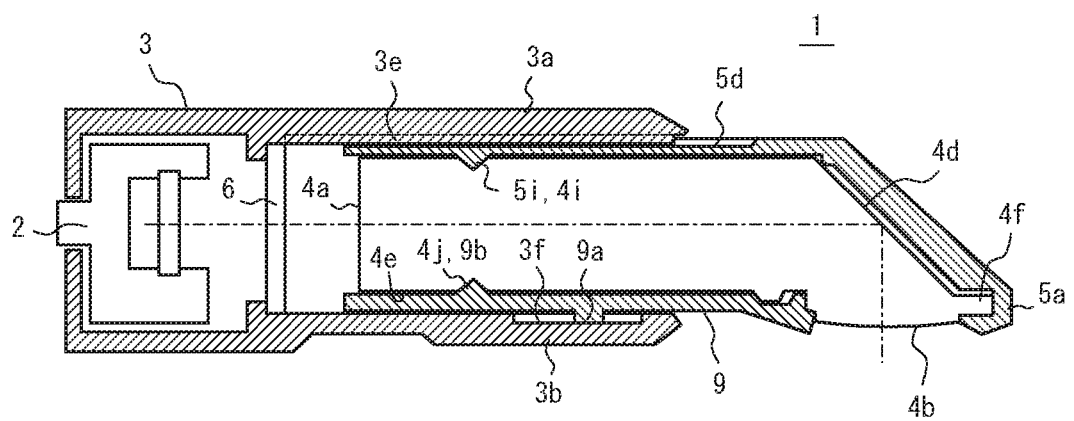
FIG. 6 is a cross-sectional view illustrating an eyepiece optical member according to Embodiment 6.

FIG. 6 is a cross-sectional view illustrating an eyepiece optical member according to Embodiment 6.

As illustrated in FIG. 6, the eyepiece optical member 1 of this embodiment includes not only the protective member 5 sandwiched between the plate-like portion 3a and the light guide prism 4 but also a protective member 9 sandwiched between the plate-like portion 3b and the light guide prism 4. In other words, a convexity 9a is formed not on the light guide prism 4 but rather on the protective member 9, and by the convexity 9a engaging with the concavity 3f provided on the plate-like portion 3b, the assembled member is prevented from dropping out. According to the embodiment illustrated in FIG. 6, the side 4e can be protected by the protective member 9.

Furthermore, as illustrated in FIG. 6, prism grooves 4i and 4j for ghost removal are provided on the light guide prism 4 and are configured to engage with convexities 5i and 9b respectively provided on the protective members 5 and 9.

According to this embodiment, the prism grooves 4i and 4j are formed on the sides 4c and 4e, thereby removing stray light and ghost light to the outside of the light guide prism 4, preventing a reduction in contrast, and preventing a ghost image from appearing around the display image.

In this disclosure, a portion or all of the two sides of the protective member 5 and the light guide prism 4 in the front-back direction of the observer are preferably polished surfaces, and the protective member 5 is preferably made of a material that transmits light. The observer can thus see through the light guide prism 4 and the protective member 5 to the outside, guaranteeing the field of view.

Embodiment 7

Figure 7A:
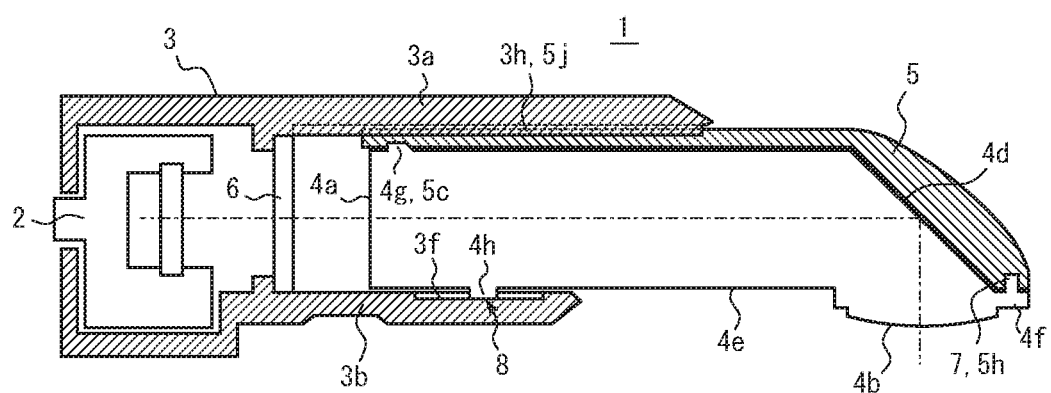
FIG. 7A is a cross-sectional view and FIG. 7B is a perspective view illustrating an eyepiece optical member according to Embodiment 7.
Figure 7B:
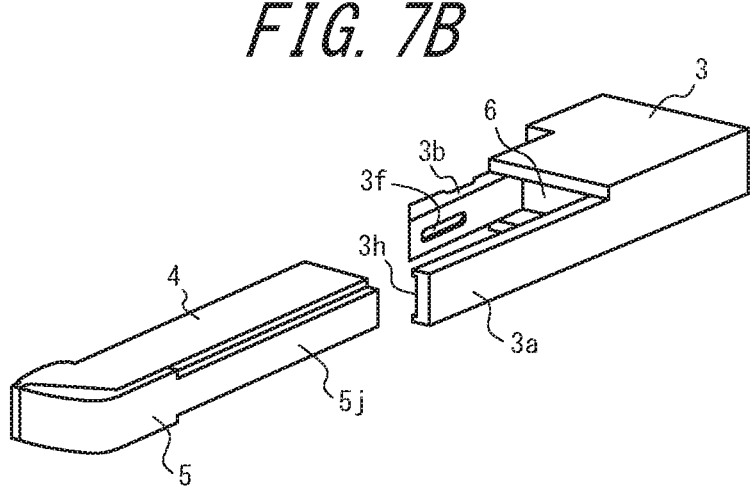

FIG. 7A is a cross-sectional view and FIG. 7B is a perspective view illustrating an eyepiece optical member according to Embodiment 7.

The eyepiece optical member 1 of the embodiment illustrated in FIGS. 7A and 7B differs from the eyepiece optical member 1 of the embodiment illustrated in FIGS. 4A, 4B, and 4C by only including one pair of the convexity 4g and the concavity 5c. Specifically, the eyepiece optical member 1 of the embodiment illustrated in FIGS. 7A and 7B does not include the convexity 4g or the concavity 5c on the reflecting surface 4d side of the plate-like portion 3b. The protective member 5 includes a narrow portion 5j with a narrow width in the vertical direction (as seen from the observer), and a receiving groove 3h that fits with the narrow portion 5j is formed on the inside of the plate-like portion 3a.

The embodiment illustrated in FIGS. 7A and 7B can achieve the same effects as those of the eyepiece optical member 1 illustrated in FIGS. 4A, 4B, and 4C and facilitates a see-through configuration as compared to the eyepiece optical member 1 of the embodiment illustrated in FIGS. 4A, 4B, and 4C, in which the slide guide receiving portion 5d is formed in the central portion of the plate-like portion 3a in the vertical direction.

Head-Mounted Display Device

Figure 8:
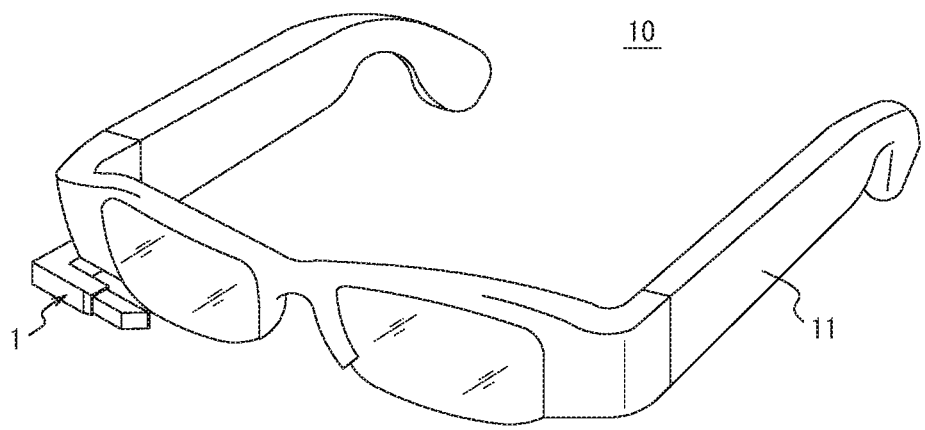
FIG. 8 is a perspective view of a head-mounted display device according to an embodiment.

FIG. 8 is a perspective view of a head-mounted display device according to an embodiment.

As illustrated in FIG. 8, this head-mounted display device 10 includes an eyeglass-type support member 11 for fixation to the wearer's head and an eyepiece optical member 1 attached to the support member. As a result, the head-mounted display device 10 may be used as a wearable device, such as a head-mounted display.

While a variety of embodiments have been described, this disclosure is in no way limited to the above embodiments. For example, in the eyepiece optical member of this disclosure, a light guide prism with a different shape than the shapes illustrated in FIGS. 1A to 6 may be used. Furthermore, in the example illustrated in FIG. 8, the head-mounted display device 10 includes the eyepiece optical member 1 illustrated in FIGS. 1A, 1B, and 1C, but the head-mounted display device 10 may instead include one of the eyepiece optical members illustrated in FIGS. 2A through 7B or another eyepiece optical member within the scope of this disclosure. An example of an eyeglass-type head-mounted display device is illustrated in FIG. 8, but for example a headband-type head-mounted display device or the like may be used instead. A variety of other modifications may also be made.

The invention claimed is:

1. An eyepiece optical member comprising:
a housing with a built-in display element;
a light guide prism in which image light from the display element enters through an entrance surface and is guided to exit from an exit surface towards an eyeball of an observer so as to be observed as a magnified virtual image; and
a protective member formed separately from the housing and covering a portion of the light guide prism, the protective member including one of a first projection or a first concavity; wherein
the housing includes two flexible opposing plate-like portions extending further towards the exit surface of the light guide prism than all other portions of the housing, at least one of the two plate-like members including the other of the first projection and the first concavity;
the light guide prism is attached to the protective member as an assembled member with the assembled member sandwiched between only the two opposing plate-like portions and with the first projection mating with the first concavity; and
the assembled member is detachable from the housing by pulling outwardly on an end of the flexible plate-like portion having the one of the first projection or first concavity to disengage the first projection from the first concavity.

2. The eyepiece optical member according to claim 1, wherein the protective member including one of a second concavity and a second projection, and the light guide prism including the other of the second concavity and the second projection; and
by the protective member and the light guide prism being sandwiched between the two opposing plate-like portions, the second concavity and the second projection engage to configure the protective member and the light guide prism as the assembled member.

3. The eyepiece optical member according to claim 1, wherein the protective member is shaped to cover a front of the eyepiece optical member when the observer of the light guide prism wears the eyepiece optical member on a head.

4. The eyepiece optical member according to claim 3, wherein the light guide prism includes a reflecting surface on at least a portion of a side of the light guide prism; and
the protective member covers at least the reflecting surface.

5. The eyepiece optical member according to claim 1, wherein the light guide prism includes a second projection for fixing the protective member, and the second projection is formed on a prism tip that is a portion of the light guide prism between the exit surface and the reflecting surface.

6. The eyepiece optical member according to claim 1, wherein an end of the protective member at the exit surface side is shaped to project further toward the observer than the exit surface.

7. The eyepiece optical member according to claim 1, wherein the housing includes an opening at one end of the housing along a direction of an optical axis of the display element, and a portion of the light guide prism at the entrance surface side is inserted into the opening;
the opening and one of the two plate-like portions form a fitting portion into which the assembled member fits;
the assembled member is slidable in a longitudinal direction of the light guide prism; and
the first projection is a convexity and the first concavity is a receiving groove which together form a pair and regulate a slide width of the assembled member, one of the convexity and the receiving groove being formed on the housing of the fitting portion and the other of the convexity and the receiving groove being formed on the protective member or the light guide prism of the fitting portion.

8. The eyepiece optical member according to claim 7, wherein by the fitting portion being releasable by the observer, the light guide prism is detachable from the housing while fixed to the protective member as the assembled member.

9. The eyepiece optical member according to claim 1, wherein one of the first projection being a slide guide or the first concavity being a slide guide receiving portion allowing the assembled member to slide in a longitudinal direction of the light guide prism is formed on one of the two opposing plate-like portions; and a second projection being a convexity or a second concavity being a receiving groove that regulate a slide width is formed on the other of the two opposing plate-like portions.

10. The eyepiece optical member according to claim 1, wherein a portion or all of two sides of the protective member and the light guide prism in a front-back direction of the observer are polished surfaces; and the protective member is made of a light transmissive material.

11. A head-mounted display device comprising:

a support member for fixation to a head of a wearer; and an eyepiece optical member attached to the support member;

the eyepiece optical member comprising:

a housing with a built-in display element;

a light guide prism in which image light from the display element enters through an entrance surface and is guided to exit from an exit surface towards an eyeball of an observer so as to be observed as a magnified virtual image; and a protective member formed separately from the housing and covering a portion of the light guide prism, the protective member including one of a projection or a concavity; wherein the housing includes two flexible opposing plate-like portions extending further towards the exit surface of the light guide prism than all other portions of the housing, at least one of the two plate-like members including the other of the projection and the concavity;

the light guide prism is attached to the protective member as an assembled member with the assembled member sandwiched between only the two opposing plate-like portions and with the projection mating with the concavity; and the assembled member is detachable from the housing by pulling outwardly on an end of the flexible plate-like portion having the one of the projection or concavity to disengage the projection from the concavity.

* * * * *